J. E. CARROLL.
PROCESS OF PURIFYING SPIRITS AND APPARATUS THEREFOR.
APPLICATION FILED DEC. 26, 1908.
968,833.
Patented Aug. 30, 1910.
2 SHEETS—SHEET 1.
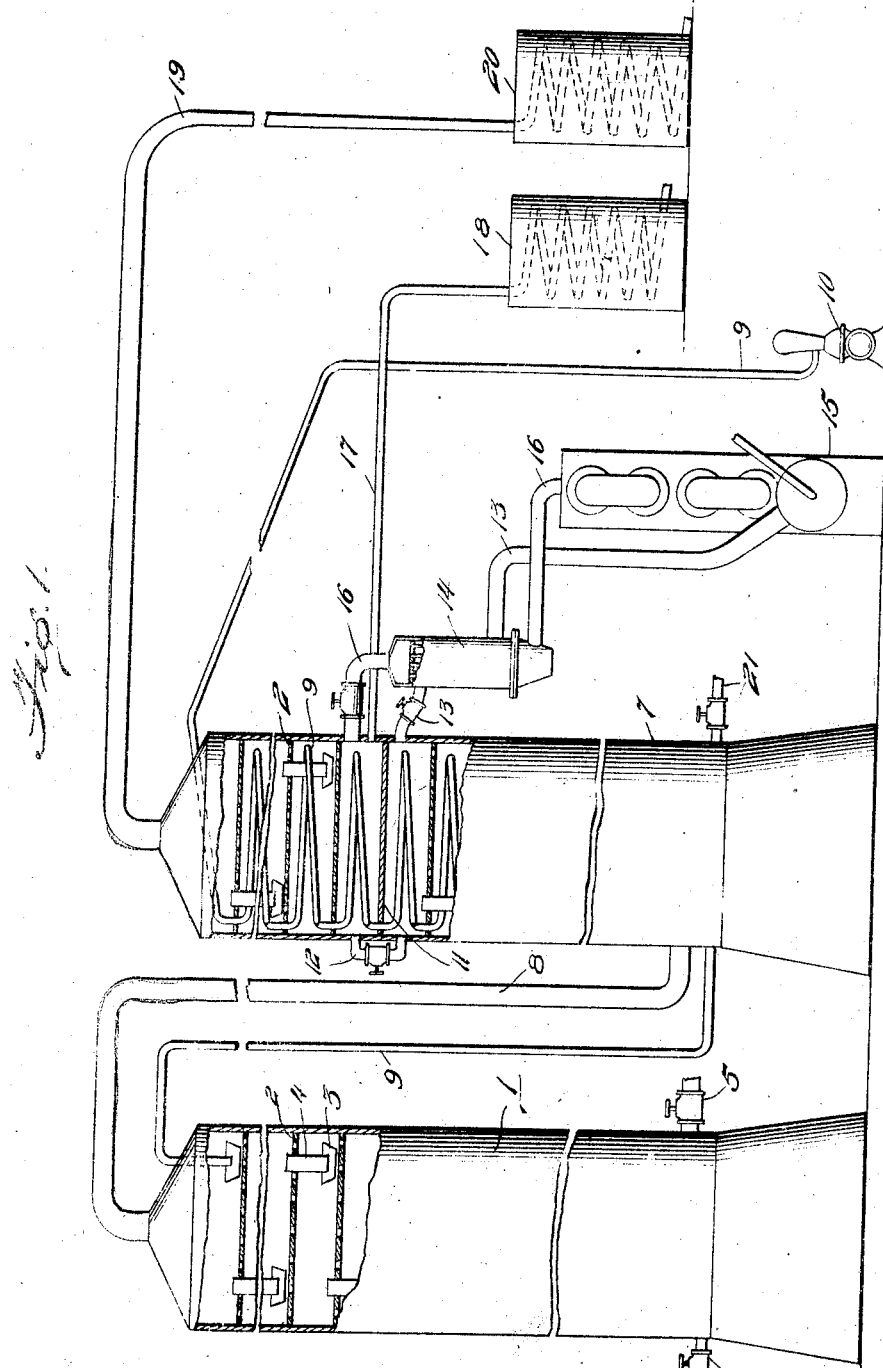

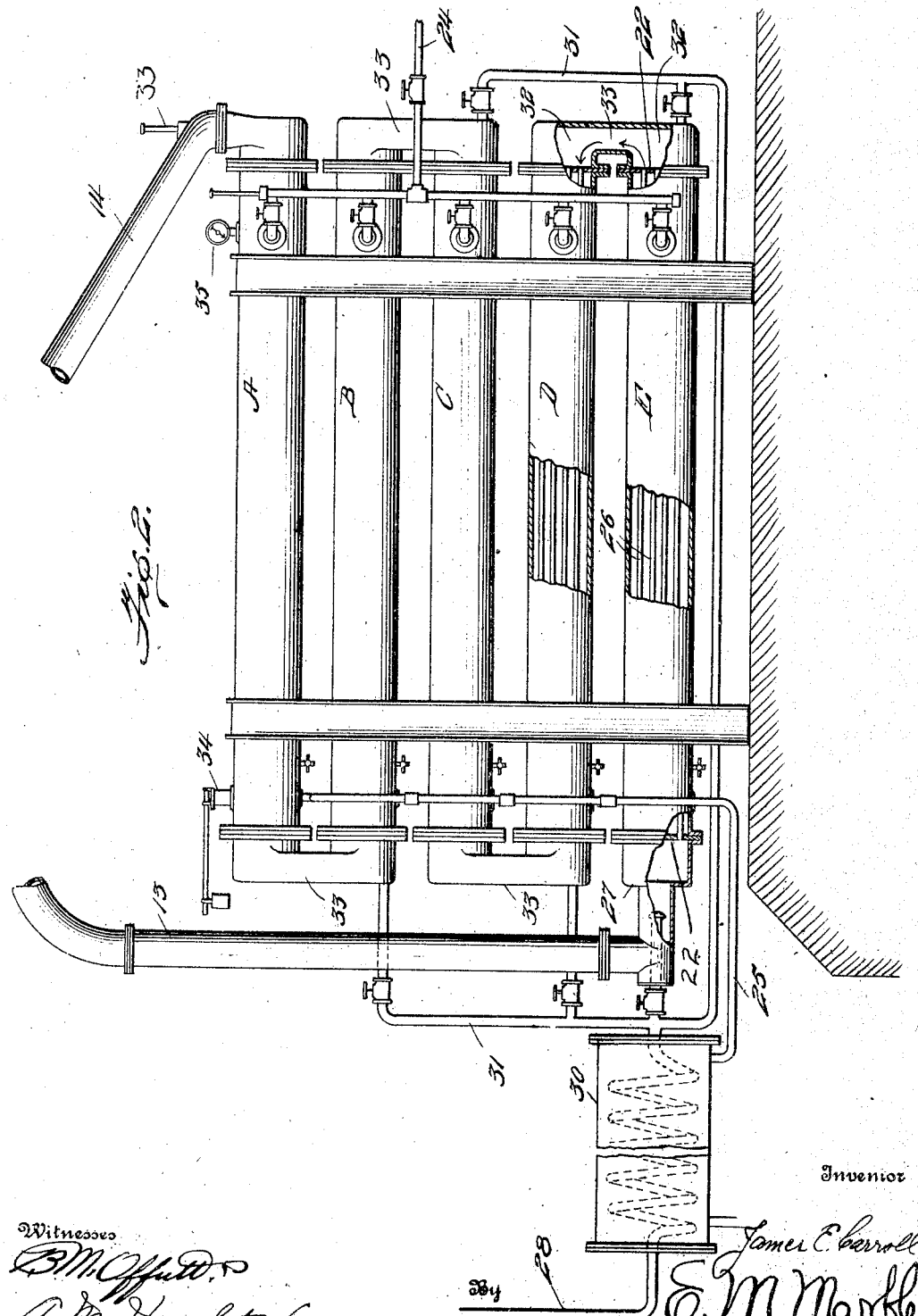

UNITED STATES PATENT OFFICE.

JAMES E. CARROLL, OF LONDON, ENGLAND.

PROCESS OF PURIFYING SPIRITS AND APPARATUS THEREFOR.

968,833.

Specification of Letters Patent. Patented Aug. 30, 1910.

Application filed December 26, 1908. Serial No. 469,318.

*To all whom it may concern:*

Be it known that I, JAMES E. CARROLL, a citizen of the United States, residing at London, England, have invented certain new and useful Improvements in Processes of Purifying Spirits and Apparatus Therefor, of which the following is a specification.

This invention relates to processes of purifying spirits and apparatus therefor; and it comprises a method of purifying distilled spirits in which such spirits in a comparatively pure state and in the form of concentrated vapors are commingled with air and exposed to a relatively high temperature in the presence of and in thorough contact with heated metal walls, such vapors being preferably drawn from a rectifying still, treated and returned to such rectifying still; and it further comprises an apparatus susceptible of utilization in the described method, such apparatus embracing a still capable of forming and delivering comparatively pure, strong alcoholic vapors, a superheating apparatus capable of heating such vapors to a comparatively high temperature and an aerator, such superheating apparatus taking vapors from such still, and superheating such vapors admixed with air and returning the treated mixture to the still;
all as more fully hereinafter set forth and as claimed.

In another and copending application, Ser. No. 461,578, filed Nov. 17, 1908, I have described and claimed a method of treating distilled liquors for the purpose of maturing or aging the same, such method consisting in superheating the crude alcoholic vapors from a still, and preferably the middle portion of the distillate only, in commixture with heated air, the mixed air and vapors being exposed in the form of relatively narrow streams to the influence of heated metal walls, whereby a thorough oxidation and maturing of such vapors is obtained. I have now discovered that this method of treatment is also applicable to the purer alcoholic vapors delivered by rectifying stills, and that by removing the vapors from a middle portion of such a still, treating them in an analogous manner and returning to the still for further treatment a much improved alcohol is obtained. As to the nature of the action I cannot say and content myself with noting the results obtained. It may be that a portion of the ethers, esters or aldehydes of about the same boiling point as alcohol are converted into substances of different boiling point or it may be merely that their flavor is simply ameliorated. In applying this method to this purpose, I preferably treat alcoholic vapors which are tolerably strong and pure, such as the vapors from a rectifying still in which the major portion, or substantially all, of the "fusel oil" has been abstracted. In the use of the ordinary "Coffey still" for example, I abstract the vapors from the rectifying column after the removal of the high boiling constituents or fusel oil, mix them with heated air in one or more portions, pass the mixture through superheated narrow tubes, and return the same to the rectifying column for the removal of "aldehyde" or low boiling constituents. The rectifying column for this purpose should be different from the usual type, being modified by the insertion of an imperforate diaphragm at a suitable point in its height. Below this diaphragm I tap the column with a vapor line leading to a superheater and above it I tap it again with a vapor line leading back from the superheater. To prevent interference with the normal course of distillation in the column, preferably I pass the outgoing and return vapor lines through a heat-exchanger so that the returning vapors may be delivered at about the temperature normal to them at the point in the still whence they are taken and to which they are returned. By the use of this precaution I am enabled to take the vapors from the still through the superheater and back to the still without interfering with the normal operation of the still, as a column still.

In the superheater, the air-vapor mixture is preferably subjected to a temperature of about 300° F., though this temperature may range 20 degrees or so above or below this point. A temperature of about 300°, is, however, usually desirable. In the superheater, the mixture should be subjected to heat in the form of streams of relatively narrow diameter, say about an inch, in tubing of appropriate diameter. The tubing may be, and preferably is, of copper, as this metal combines both a good degree of resistance to the action of the hot air-vapor mixture and a good catalytic action or wall action in promoting interaction between the air and vapor. This catalytic action is very important in the present process since the desired action does not occur to the degree desired unless the air-vapor mixture comes into actual contact with the heated metal walls. It is for this reason, largely, that narrow tubing must be used since with wider tubing there is no certainty that every portion of the mixture will come into actual contact with the hot metal. In mixtures of air and vapor, particularly when heated, it is difficult to procure thorough admixture and to secure positive contact of every portion of such mixture, as a mixture, with the walls of the containing vessel if the volume of such mixture be large. As the volume of vapor coming from any still of commercial size must of necessity be rather large, I therefore preferably subdivide the mass of vapor, after admixing it with air (and this air should be hot to secure as good admixture as practicable), into a plurality of small streams, each being transmitted through a metal tube of appropriate size, and I remix and resubdivide at intervals in the progress of such mixture through the apparatus, thereby securing an intimate and positive commingling as well as a positive contact of every portion of the body with a hot metal wall at some point in its course. The air may be introduced at a plurality of points in such course through the apparatus.

In the accompanying illustration, I have shown, rather diagrammatically, certain embodiments of apparatus susceptible of employment in the described process.

In this showing: Figure 1 is a view, partly in vertical section, of a complete apparatus; and Fig. 2 is a view at right angles to the view of Fig. 1, showing the superheater and accessory parts on a larger scale.

In Fig. 1, largely for the sake of simplicity, the still and rectifier shown as employed with the superheater, are shown as those of a simple, old-type Coffey still. In this showing, 1 is the analyzer, dephlegmator or still, provided with the usual perforated plates 2, cups 3, tubes 4, steam or vapor inlet 5 and wash outlet 6. Element 7 is the rectifying still fed at its base with alcoholic vapors from the dephlemator through vapor line 8 in the usual way. Internally, it is also provided with the usual perforated plates, cups and tubes like those of the dephlegmator and with a spiral preheater pipe 9, extending from top to bottom and supplied with crude liquid by pump 10. In one point however it differs from the ordinary type, it being provided with an imperforate septum 11 extending across the still and dividing the column into upper and lower sections. The preheater pipe extends through this septum, but there is no communication past the diaphragm between upper and lower parts of the column internally. Should such communication for any reason be desired, it may be afforded by valved by-pass 12. Immediately below the septum, is vapor line 13 leading through heat-exchanger 14 to a superheater, designated as a whole by character 15. From the superheater, return vapor line 16 leads vapors through the heat interchanger back to the still above the septum. Alcohol line 17 leads alcohol from a point immediately above the septum to and through a cooler and condenser 18. Aldehydes and low-boiling bodies leave the rectifier through vapor line 19 which passes to and through a condenser 20. Valved outlet 21 at the base of the rectifier allows the removal of high-boiling bodies, such as fusel oil.

The superheater, 15, is shown in more detail in Fig. 2. As there illustrated, it comprises five similar casings, respectively lettered A, B, C, D and E, though there may be any number. Each of these elements consists of a long tubular shell having a header at each end, respectively 22 and 23, and forming a steam chamber, supplied from steam line 24, therebetween. The steam chambers are provided with an exhaust line 25. In order to maintain substantially the same temperature in all the chambers, each is provided with a separate connection to the steam and the exhaust lines as shown, though other connections may be employed. Passing between the headers in each shell is a tube nest 26, the tubes being of comparatively small diameter, preferably not over an inch, and being made, preferably of copper, or internally surfaced with copper.

The vapor line 13 from the rectifier communicates with a mixing chamber 27. With this chamber also communicates an air pipe 28, preferably ending therein in a rose or other form of distributer, 29, and supplied with air under pressure from a suitable source (not shown). This air pipe passes through a steam chamber 30, which may be, as shown, supplied with steam from the exhaust line from the superheaters. Manifolds 31, 31, allow separate introduction of hot air into the several superheaters if desired. Beyond the steam chamber in each superheater, the tubes open into mixing chambers 32, connected by uptakes 33. Safety valve 34, pressure gage 35, pyrometer 36 in the steam line, and thermometer 37 in the return vapor line (14) are of the usual construction.

In the operation of the described structure, crude alcoholic liquid is sent through pipe 9 through the rectifying column, thereby becoming heated progressively as it passes downward and assisting in maintaining the temperatures in the rectifying column at the proper points. Passing into the dephlegmator it is delivered on an upper shelf and thence passes downward through the shelves in the manner customary in column stills, yielding alcoholic vapors at the head of the column and a watery residue at the base. Heating in this still is done by steam introduced at the base through 5. The alcoholic vapor is delivered into the base of the rectifier through 8 and passes upward, becoming steadily more concentrated in the manner usual in column stills. Its progress upward is, however, interrupted by the imperforate septum. If for any reason it be desired to run the rectifier in the ordinary way, the vapors may be by-passed through 12, several such by-passes being provided if desired, and the column then operates in the ordinary manner, alcohol and alcohol vapor being removed above the septum by 17 while aldehydes and low-boiling bodies progress upward to vapor line 19. Operating according to the present process, however, the by-pass 12 is closed and the rich alcohol vapors below the septum are taken away by 13, passed through heat-interchanger 14, whereby they are heated, and are then introduced into mixing chamber 27, where they are thoroughly mixed with hot air from 28. The mixed body of air and vapor thus formed is subdivided into a plurality of small-diameter streams in the pipe-nest and passes forward therethrough, each portion of such body thereby coming into effective contact with the heated metal walls. This effective contact is very important since the catalytic or wall action of the metal walls insures effective reaction between the air and vapor in a way not possible between air and vapor simply heated together for the same period of time. It is for this reason that the tubes of the tube nest should be of small diameter and should preferably be of copper, or internally copper-faced, copper having a desirable catalytic action for this purpose as well as being able to withstand the corrosive action of the hot mixture. The temperature maintained may be as desired, but generally is preferably kept about 300° F., or within a margin of, say, 20° either way from that temperature. Steam of 500° to 700° F., expanded to a pressure of about 7 or 8 pounds, may be employed as the heating agent.

Passing through the tubes, the plurality of small streams of mixed air and vapor are remingled in chamber 32 at the other end of the superheater, and pass upward through uptake 33, being thoroughly mingled in so doing, and thence pass in a reverse direction through the tube nest of the next superimposed superheater, the body of the mixture being again subdivided into a plurality of streams and exposed to effective contact with the metal walls, and so on upward through the apparatus. There is a tendency to stratify in gas mixtures going through a heated tube, though this tendency is of course less with the small diameter tubes here employed, but in being reversed in direction in the manner indicated, the mixed current is thoroughly remingled since in such reversal of direction of flow, lower strata tend to become upper and the reverse. If desired, air may be mixed with the vapors portionwise by the use of the manifolds shown. The pyrometer in the steam line and the thermometer in the outgoing vapor line enable a very accurate control of temperatures.

Since the outgoing mixture of air and vapor leaving the superheater has a temperature of about 300°, which is far above any temperature prevailing in the rectifier, the mixture must be cooled before re-introduction thereinto, and this is very conveniently effected by heat-exchanger 14, which will automatically bring the mixture back to about the right temperature.

Returning to the rectifier, the low-boiling constituents are removed in the usual way in the trays of the column above the septum and the concentrated, now clean-smelling alcohol is removed by 17. As the quantity of the impurities to be removed is apparently often increased, it is advantageous to have the upper portion of the column above the septum somewhat higher than is usual.

In the described method of treatment, the alcohol is first concentrated in the dephlegmator, freed of fusel oil in the lower section of the rectifier, superheated in contact with air and catalytically-acting metal walls, and returned to the rectifier to be freed of aldehydes, etc.

What I claim is:—

1. The process of producing spirits which comprises distilling alcoholic liquids to produce concentrated alcoholic vapors low in fusel oil, admixing the hot vapors with air, reheating the mixture in such manner as to bring every portion of the mixture into positive contact with a hot metal wall and thereafter continuing the distillation to form pure spirits.

2. The process of producing spirits which comprises distilling alcoholic liquids to produce concentrated alcoholic vapors low in fusel oil, admixing the hot vapors with air to form a mixed body, subdividing the mixture into a plurality of small streams, reheating each such stream in contact with a metal wall, thereafter reuniting the streams and continuing the distillation to form pure spirits.

3. The process of producing spirits which comprises distilling alcoholic liquids to produce concentrated alcoholic vapors low in fusel oil, admixing the hot vapors with air to form a mixed body, subdividing the mixture into a plurality of small streams, reheating each such stream in contact with a metal wall kept at a temperature of about 300° F., thereafter reuniting the streams and continuing the distillation to form pure spirits.

4. The process of producing spirits which comprises distilling alcoholic liquids to produce concentrated alcoholic vapors low in fusel oil, admixing the hot vapors with air, reheating the mixture in such manner as to bring every portion of the mixture into positive contact with a hot metal wall kept at a temperature of about 300° F., thereafter reuniting the streams and continuing the distillation to form pure spirits.

5. The process of producing pure spirits which comprises distilling alcoholic spirits in a column still to produce rich vapors substantially free from fusel oil, intercepting the vapors from a mid-point in the still, admixing with air and reheating to a higher temperature, and returning the mixture so treated to the still for further distillation.

6. The process of producing pure spirits which comprises distilling alcoholic spirits in a column still to produce rich vapors substantially free from fusel oil, intercepting the vapors from a mid-point in the still, admixing with air and dividing into a plurality of small streams, reheating each such stream in contact with a hot metal wall, reuniting the streams and returning the treated mixture to a still for further distillation.

7. The process of producing pure spirits which comprises distilling alcoholic spirits in a column still to produce rich vapors substantially free from fusel oil, intercepting the vapors from a mid-point in the still, admixing with air and dividing into a plurality of small streams, reheating each such stream in contact with a hot metal wall kept at a temperature of about 300° F., and returning the treated mixture to a still for further distillation.

8. The process of producing pure spirits which comprises distilling alcoholic spirits in a column still to produce rich vapors substantially free from fusel oil, intercepting the vapors at a mid-point in the still, passing through a heat-interchanger in thermal relationship to returning vapors, admixing with air, reheating to a higher temperature and returning the mixture so treated to the still through said heat-interchanger for further distillation.

9. The process of producing pure spirits which comprises distilling alcoholic spirits in a column still to produce rich vapors substantially free from fusel oil, intercepting the vapors at a mid-point in the still, passing through a heat-interchanger in thermal relationship to returning vapors, admixing with air, reheating in positive contact with metal walls maintained at about 300° F., and returning the mixture so treated to the still through said heat-interchanger for further distillation.

10. The process of producing pure spirits which comprises distilling alcoholic spirits in a column still to produce rich vapors substantially free from fusel oil, intercepting the vapors at a mid-point in the still, passing through a heat-interchanger in thermal relationship to returning vapors, admixing with air and subdividing into a plurality of small streams, reheating each such stream in positive contact with a hot metal wall, reuniting the streams and returning the mixture so treated to the still through said heat-interchanger for further distillation.

11. The process of producing pure spirits which comprises distilling alcoholic spirits in a column still to produce rich vapors substantially free from fusel oil, intercepting the vapors at a mid-point in the still, passing through a heat-interchanger in thermal relationship to returning vapors, admixing with air and subdividing into a plurality of small streams, reheating each such stream in positive contact with a hot metal wall maintained at a temperature of about 300° F., reuniting the streams and returning the mixture so treated to the still through said heat-interchanger for further distillation.

12. In an alcohol treating apparatus, the combination of a column still having an imperforate septum therein with means for removing alcoholic vapors below such septum, means for admixing such vapors with air and superheating, and means for returning such mixed vapors back to the still above the septum.

13. In an alcohol treating apparatus, the combination of a column still having an imperforate septum therein with means for removing alcoholic vapors from a point below such septum, and means for aerating, superheating and returning such vapors to a point above such septum, such latter means including a heat-interchanger adapted to heat outgoing vapors and cool ingoing vapors.

14. In an alcohol treating apparatus, the combination of a column still with a rectifying column still, said rectifying still being provided at a point intermediate its top and base with means for intercepting the current of rising alcoholic vapors, means for removing, aerating and superheating the intercepted vapors and means for returning the treated vapors to the still above such point.

15. A rectifying still provided with means for intercepting and removing alcoholic vapors rising therethrough, aerating and superheating such vapors and returning the treated vapors to the still at a point above the point of interception, such means including a steam-heated superheater provided with a plurality of relatively small parallel tubes.

16. A rectifying still having means for intercepting and removing alcoholic vapors ascending therethrough and for superheating such vapors in admixture with air and for returning the aerated and treated vapors thereto above the point of interception for further fractionation.

17. The combination with a column still of a superheater, means in the still for intercepting alcoholic vapors ascending therethrough, pipe connections below such means adapted to divert vapors passing through said still into and through said superheater and back to the still above such means, means for aerating the vapors in the superheater and a cooling device in said pipe connection adapted to cool the vapors transmitted back to the still.

18. The combination of a column still having means for intercepting the current of alcoholic vapors ascending therethrough with a superheater having pipe connections around such means adapted to withdraw and return vapors to said still, said superheater being provided with means for aerating vapors passing therethrough.

19. In an alcohol treating apparatus, a column still, means for intercepting the current of alcoholic vapors ascending in such still, a superheater provided with a plurality of pipe nests and mixing devices, means for heating said pipe nests, means for heating air, and connections around such intercepting means adapted to withdraw vapors from said still, produce a mixture of said vapors with hot air, transmit the same through the superheater and thence back to the still.

20. In an alcohol treating apparatus, a concentrating column still, a rectifying still, means for delivering alcoholic vapors from the concentrating still into the rectifying still, a superheater, means for cutting the communication between the base and top of said still, means for withdrawing vapors from a point below such means in said rectifying still, means for admixing said vapors with heated air and transmitting the mixture through the superheater, and means for returning the treated mixture to the rectifying still at a point above the point of withdrawal and above the point where the communication between the base and the top of the still is intercepted.

In testimony whereof I affix my signature, in presence of two witnesses.

JAMES E. CARROLL.

Witnesses:
JAMES H. TRACY,
J. W. HANNIGAN.